(12) United States Patent
Wadhawan

(10) Patent No.: US 7,831,694 B2
(45) Date of Patent: Nov. 9, 2010

(54) TRANSFER OF ELECTRICAL DATA WITH AUTO-DISCOVERY OF SYSTEM CONFIGURATION

(76) Inventor: Arvind Wadhawan, 1508 Kemah Ct., Brentwood, TN (US) 37027

( * ) Notice: Subject to any disclaimer, the term of this patent is extended or adjusted under 35 U.S.C. 154(b) by 1217 days.

(21) Appl. No.: 11/433,305

(22) Filed: May 11, 2006

(65) Prior Publication Data

US 2007/0263643 A1 Nov. 15, 2007

(51) Int. Cl.
*G06F 15/177* (2006.01)
*G06F 15/173* (2006.01)
(52) U.S. Cl. .................................. 709/220; 709/224
(58) Field of Classification Search ................ None
See application file for complete search history.

(56) References Cited

U.S. PATENT DOCUMENTS

| | | | | |
|---|---|---|---|---|
| 6,353,854 | B1 * | 3/2002 | Cromer et al. ............. | 709/224 |
| 6,507,794 | B1 * | 1/2003 | Hubbard et al. ............ | 702/60 |
| 6,931,445 | B2 * | 8/2005 | Davis ....................... | 709/224 |
| 7,177,728 | B2 * | 2/2007 | Gardner .................... | 700/295 |
| 7,349,815 | B2 * | 3/2008 | Bickel et al. ............... | 702/60 |
| 7,472,179 | B2 * | 12/2008 | Tarui et al. ................. | 709/223 |
| 2004/0128146 | A1 | 7/2004 | Williams et al. ............ | 705/1 |
| 2007/0043853 | A1 * | 2/2007 | Rustad et al. .............. | 709/224 |

OTHER PUBLICATIONS

DEC Data Systems: "DEC Data Systems—DataWise Manual" May 6, 2006, XP002470188, p. 5-p. 6, p. 58-60, p. 129.

Don Landing et al.: "Sensor Data Analysis Framework Research Roadmap—Integrating Stream Processing and Persistent Data Retrieval", Feb. 2006, XP002470189, the whole document.
Harrison M: "EPC Information Service—Data Model and Queries" Internet Citation, Oct. 1, 2003, XP002355668, the whole document.
Gehrke J et al: "Sensor and Actuator networks—Query processing in sensor networks" IEEE Pervasive Computing, IEEE Service Center, Los Alamitos, CA, US, vol. 3, No. 1, Jan. 2004, pp. 46-55, XP0011108155, the whole document.
Bonnet P et al: "Querying the Physical World" IEEE Personal Communications, IEEE Communications Society, US, vol. 7, No. 5, Oct. 2000, pp. 10-15, XP000966619, the whole document.

(Continued)

*Primary Examiner*—Patrice L Winder
*Assistant Examiner*—Minh-Chau Nguyen

(57) ABSTRACT

Automatic discovery of configuration or identification information published by a local computer (publisher) connected to electrical monitoring devices in a power monitoring system and to a server that determines whether to approve data packets sent by the publisher. The publisher attempts to send a data packet including identification information to the server, which throws an exception with error code(s) indicating which information is missing in order for the server to approve the pending data transfer. The publisher interprets the error code(s) and sends back to the server the missing information, which may be identification information, configuration information, or both. This process of the server throwing an exception and the publisher attempting to send data packets or configuration information again may iterate more than once until the server approves the publisher, the device, and all topic information associated with the device and accepts the data for storage in the server database.

22 Claims, 7 Drawing Sheets

OTHER PUBLICATIONS

Ledlie J et al: "Provenance-Aware Sensor Data Storage" Data Engineering Workshops, 2005, 21st International Conference on Tokyo, Japan Apr. 5-8, 2005, Piscataway, NJ, USA, IEEE, Apr. 5, 2005, pp. 1189-1189, XP010924091, the whole document.

Kevin Chang et al: "SensorBase.org—A Centralized Repository to Slog Sensor Network Data" Center for Embedded Network Sensing. Papers. Paper 116, May 5, 2006, XP002470190, the whole document.

Written Opinion corresponding to co-pending International Patent Application Serial No. PCT/US2007/011247, European Patent Office, dated May 15, 2008, 12 pages.

International Search Report corresponding to co-pending International Patent Application Serial No. PCT/US2007/011247, European Patent Office, dated May 15, 2008, 8 pages.

* cited by examiner

TRANSFER OF ELECTRICAL DATA WITH AUTO-DISCOVERY OF SYSTEM CONFIGURATION

FIELD OF THE INVENTION

This invention is directed generally to auto-discovery of configuration/identification information, and, more particularly, to auto-discovery of configuration/identification information related to a utility monitoring system such as a power monitoring system.

BACKGROUND OF THE INVENTION

In a power monitoring system, various installations send electrical data from data collection nodes to a data collection server that is administered according to a known system configuration. However, the system configuration can change over time as new devices are added or existing devices are removed from the system or as the setup of devices are changed in the system, requiring constant server administration. For each new device added or existing device removed, the system configuration must be manually updated at the data collection server to reflect the change. The data collection nodes typically include microprocessor-based electrical power equipment, such as power monitors, lighting control systems, meters, circuit breaker controllers and the like, which accumulate considerable amounts of data concerning the electrical distribution systems to which they are connected, as well as the power equipment itself. Each device has a particular configuration that must be known by the server so that it can receive meaningful data from the device. Because the process is manual, it is prone to human error and time-consuming.

Thus, a need exists for an improved apparatus and method. The present invention is directed to satisfying one or more of these needs and solving other problems.

SUMMARY OF THE INVENTION

In an embodiment of the present invention, a method of auto-discovering information associated with devices arranged in a monitoring system (such as a power monitoring system) that monitors measurable quantities of a utility (such as water, air, gas, energy, steam, or weather) is provided. The method includes receiving configuration information from a local computer in the monitoring system at a server, the local computer attempting to send a data packet associated with a device to the server; determining from the configuration information whether the local computer is approved to have the data packet accepted by the server, the determining including comparing the configuration information against system configuration stored in the server; throwing from the server to the local computer an exception indicating that the configuration information includes information not recognized by the server; responsive to the determining, if the local computer is approved, determining whether the device is approved to have the data packet accepted by the server; and responsive to the determining, if the local computer is not approved, automatically approving the local computer by updating the system configuration with the configuration information. The exception may be selected from among a plurality of exception types, each exception type indicating that information which is required by the server to approve the device. The receiving may be optionally carried out behind a firewall imposed between the local computer and the server, the throwing including throwing from the server to the device the exception through the firewall.

The method may further include queuing the data packet in the local computer or the server until the data packet is accepted by the server. The data packet in some embodiments includes measured electrical data. In some embodiments, the local computer includes the server. In some embodiments, the configuration information includes local computer information, device information, and topic information.

In some embodiments, a first exception type indicates that the local computer information, the device information, or the topic information is not approved by the server. The topic information may be a topic that relates to an electrical characteristic.

In some embodiments, the data packets include identification information, and the method further includes determining from the identification information whether the device is approved to have the data packet accepted by the server; if the device is approved, accepting the data packet at the server and storing the data packet in a database of the server; and if the device is not approved, throwing an exception from the server to the local computer, the exception indicating which identification information is required by the server to accept the data packet, and automatically approving the device. This method may still further include queuing the data packet in a queue of the local computer; responsive to the device not being approved and automatically approving the device, receiving the data packet from the queue and storing the data packet in the database.

According to an embodiment of the present invention, a method of automatically approving the acceptance of data packets at a server in a power monitoring system includes receiving configuration information at a server from a computer, the computer attempting to publish a data packet associated with an electrical monitoring device in the power monitoring system, the data packet including data indicative of a measured electrical characteristic and identification information; throwing an exception from the server to the computer in response to the server not recognizing some or all of the configuration information; automatically approving at least some of the unrecognized configuration information; and sending the data packet until the server accepts the data packet.

The sending may include queuing the data packet in the local computer or the server until the server accepts the data packet. The exception may be selected from among a plurality of exception types, each exception type indicating a different type of configuration information that is required by the server. The configuration information may be information relating to the local computer and/or information relating to the device. The identification information may include information relating to at least the identity of the originator of the data packet, the computer, and the device.

Any of the foregoing methods may be performed by one or more controllers that are directed by instructions encoded in a non-transitory computer readable storage medium.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings, in which.

DETAILED DESCRIPTION OF THE ILLUSTRATED EMBODIMENT

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
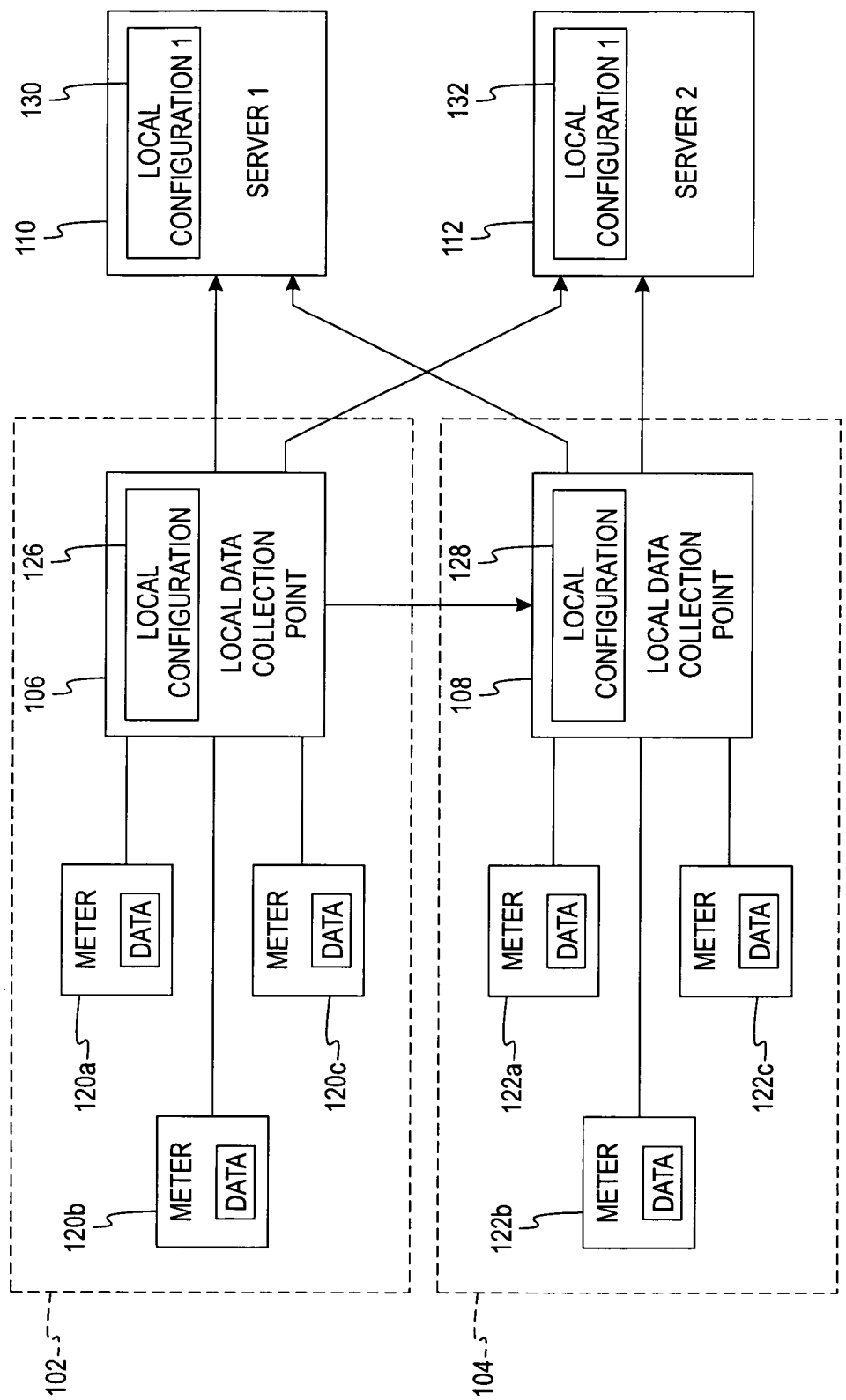
FIG. 1 is a functional block diagram of a monitoring system in which the present invention may be utilized.

Referring now to the drawings, and initially to FIG. 1, a monitoring system 100 is shown. The monitoring system 100 may be any system that monitors measurable characteristics of a utility, including water, air, gas, energy, steam (collectively abbreviated as WAGES), and weather. An implementation is a power monitoring system, and the illustrated embodiments herein are directed to a power monitoring system; however, it should be understood that the present invention applies as equally to power monitoring systems as to other WAGES monitoring or weather station systems.

A power monitoring system 100 is typically arranged in a hierarchy with monitoring devices such as electrical meters 120, 122 installed at various levels of the hierarchy. Monitoring devices measure various characteristics of the electrical signal (e.g., voltage, current, waveform distortion, power, etc.) passing through the conductors, and the data from each monitoring device 120, 122 is collected by local data collection points 106, 108 within the monitoring system 100 and communicated to one or more servers 110, 112 for storage or analysis.

FIG. 1 shows two installations 102, 104 each comprising respective local data collection points or nodes 106, 108. The points or nodes 106, 108 may be implemented in hardware as a computer. The meters 120, 122 send their respective data to the appropriate local data collection point 106, 108, which have local configuration information 126, 128 regarding the devices 120, 122 to which each node is connected. Each node 106, 108 can communicate with either or both servers 110, 112 via communication links directly or via a network. In an embodiment, the computer 106 includes the server 110. In other embodiments the computers and servers are different computers. The computers 106, 108 and servers 110, 112 may be comprised of a single computer or multiple computers. The computers 106, 108 may also be referred to herein as publishers and the servers 110, 112 may be referred to as subscribers. A publisher includes a software application that attempts to push data out to a subscriber.

Figure 3:
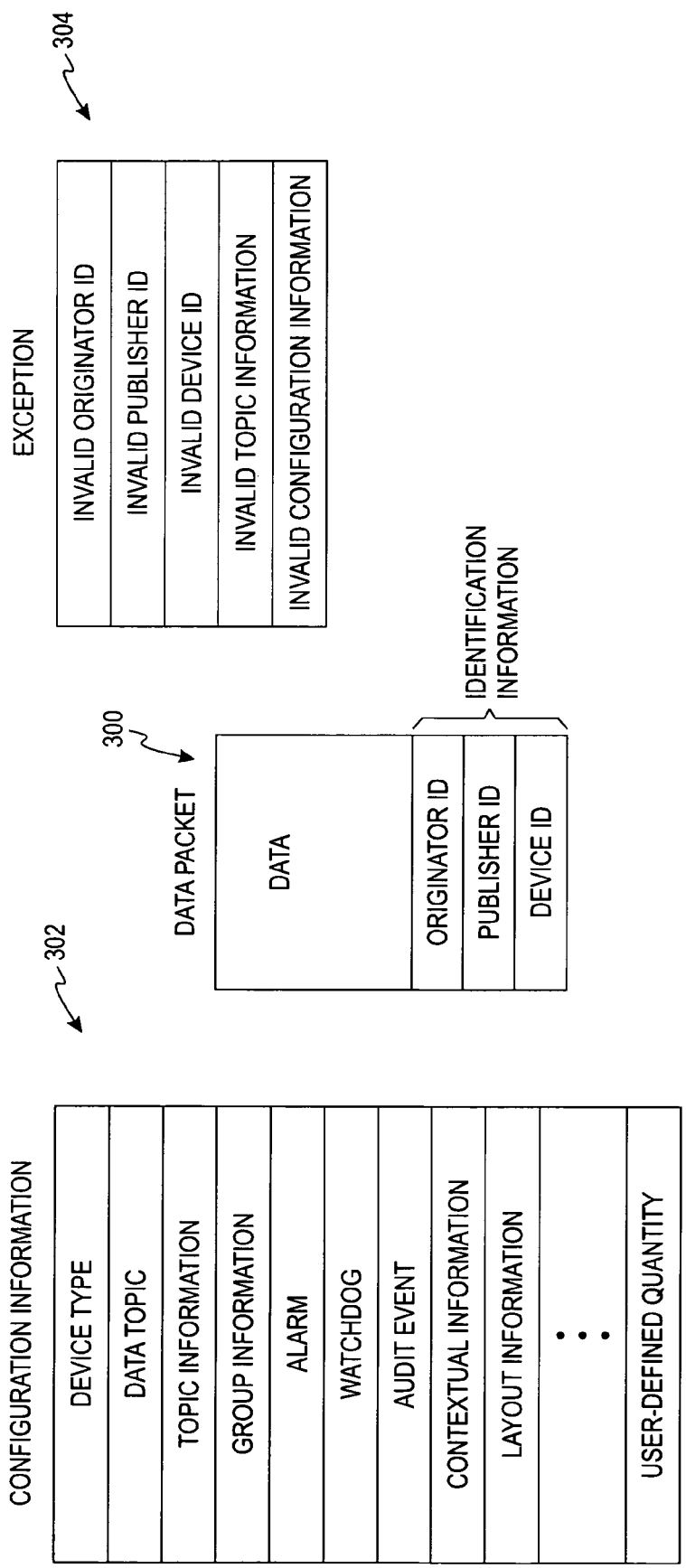
FIG. 3 illustrates exemplary fields of information that may be included within a data packet, configuration information, and an exception, according to an aspect of the present invention.

Each publisher 106, 108 has an associated publisher identification that uniquely identifies it in the power monitoring system 100. Each device 120, 122 also has an associated device identification that uniquely identifies the device in the power monitoring system 100. Thus, a data packet from meter 120a, for example, will include a publisher identification (ID) that identifies the installation 102 in which the meter 120a exists as well as a device ID that uniquely identifies the device 120a from all other devices 120b, 120c and 122a,b,c. In addition, the data packet also includes an originator ID that identifies the originating installation of the data packet. For example, the publisher 106 may send a data packet from meter 120a to the publisher 108. That data packet includes an originator ID that identifies the installation 102 as the originator, a publisher ID (which is the same as the originator ID), and a device ID. When that data packet is sent to one of the servers 110, 112, the publisher ID is changed to reflect that publisher 108 has sent the data packet, but the originator ID remains unchanged such that the server 110, 112 knows that the data packet originated from installation 102 and not installation 104. As used herein, the originator ID, publisher ID, and device ID are referred to as identification information. FIG. 3 illustrates an example of a data packet 300 including data and identification information.

In addition to data packets, the publishers 106, 108 also include local configuration information 126, 128. The configuration information 126, 128 includes any one or more of the following information: the type of device, the type of data (topical information such as current, voltage, power, energy, and the like), unit of measurement, the group to which the data belongs, user-defined quantities, alarms, system health information, watchdog, audit events, hierarchical information about the monitoring system 100, system context (e.g., the contextual relationship of the meters 120, 122 within the system 100), power-distribution layout information (e.g., how the feeders and meters 120, 122 are distributed on the grid), and environmental data. Examples of fields that may be included within a configuration information 302 is shown in FIG. 3. Examples of group names and their associated topics are found in Table 1 below.

The system configurations 130, 132 in the servers 110, 112 store all local configuration information that has been approved. When a new publisher, for example, attempts to send data to one of the servers 110, 112, the local configuration information for the new publisher must be learned by the servers 110, 112 before data packets will be accepted from the new publisher. This aspect of the present invention is described more fully below.

Figure 2:
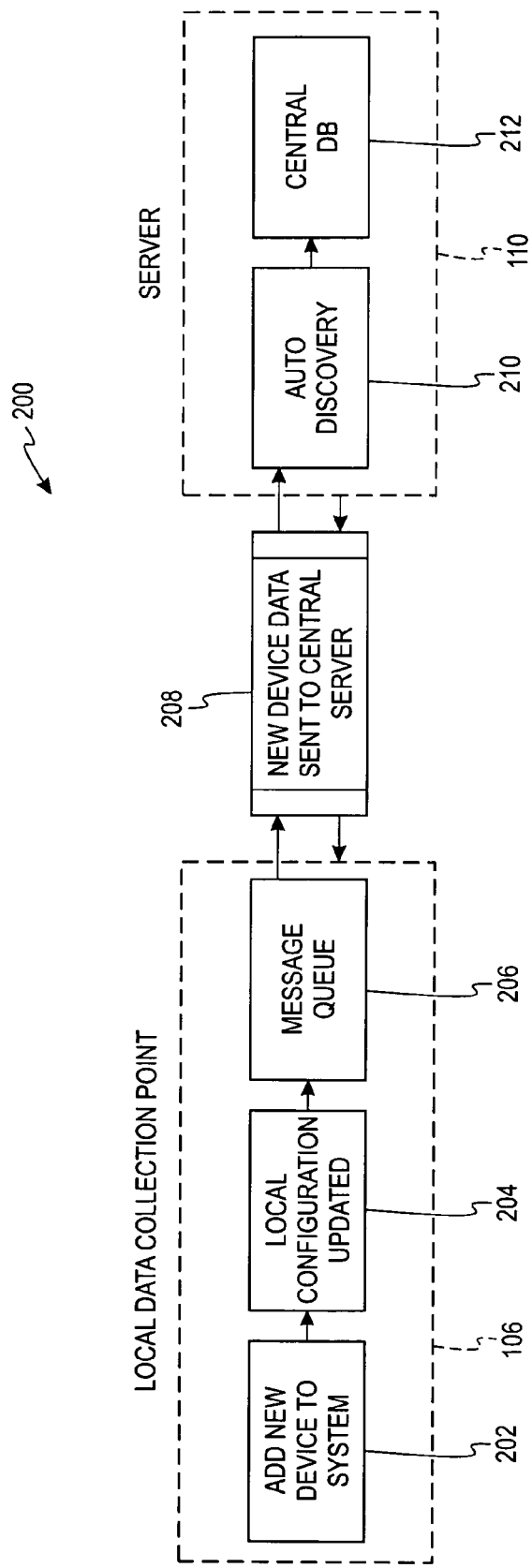
FIG. 2 is a system flow diagram 200 of the auto-discovery aspect of the present invention.

FIG. 2 is a system flow diagram 200 of an auto-discovery aspect according to the present invention. When a new device is added to the power monitoring system 100 (202), the local configuration 126 for that publisher 106 is updated (204). Data packets from the new device are stored in an optional message queue 206 for reasons that are explained in more detail below. Generally, the message queue 206 can be used to guarantee that data packets will be delivered and stored on the server 110, and serve as a buffer for data packets awaiting approval by the server 110 while the publisher 106 attempts to comply with the requests for further information from the server 110. As mentioned above, each new data packet from the new device includes identification information (e.g., originator ID, publisher ID, and device ID).

Assuming the publisher 106 is already approved by the server 110, the publisher 106 sends the new data packet to the server 110 (208). The server 110 checks its system configuration 130 to determine whether it can accept the new data packet. Because the device is a new device, the server 110 throws an exception or error code to the publisher 106 indicating which information is prerequisite to a successful completion of the data transfer. The exception, for example, may indicate that the configuration information for the new device is invalid or unknown to the server 110 (FIG. 3 shows an example of some exemplary error codes of an exception 304). The publisher 106 responds by sending the information embedded in the exception, such as the new configuration information for the new device, and resends the data packet. Once the publisher 106 publishes all of the required configuration information requested by the server 110, the server 110 accepts the new data packet and the new device. When the publisher 106 subsequently attempts to send data packets from the new device, they are accepted by the server 110 without exception and the approval process is completed without manual intervention by the operator.

On the server 110 (or subscriber) side, the present invention contemplates a process of auto-discovery (210) that automatically learns and/or automatically approves identification information and/or configuration information. A software program running on the server 110 implements the auto-discovery feature of the present invention, and the software program interfaces with a central database 212 within the server 110 where the accepted data packets are stored for later retrieval or analysis.

In automatic learning mode, the auto-discovery 210 block can learn identification information or configuration information without necessarily approving it. To do so, the server 110 stores the identification information or configuration information in the database 212. In automatic approval mode, the auto-discovery 210 block can actually approve identification information or configuration information that it has learned. Approval may be setting a flag that indicates approval in the database 212. Only when approval is granted by the server 110 will the server accept data packets from the publisher 106.

Figure 4:
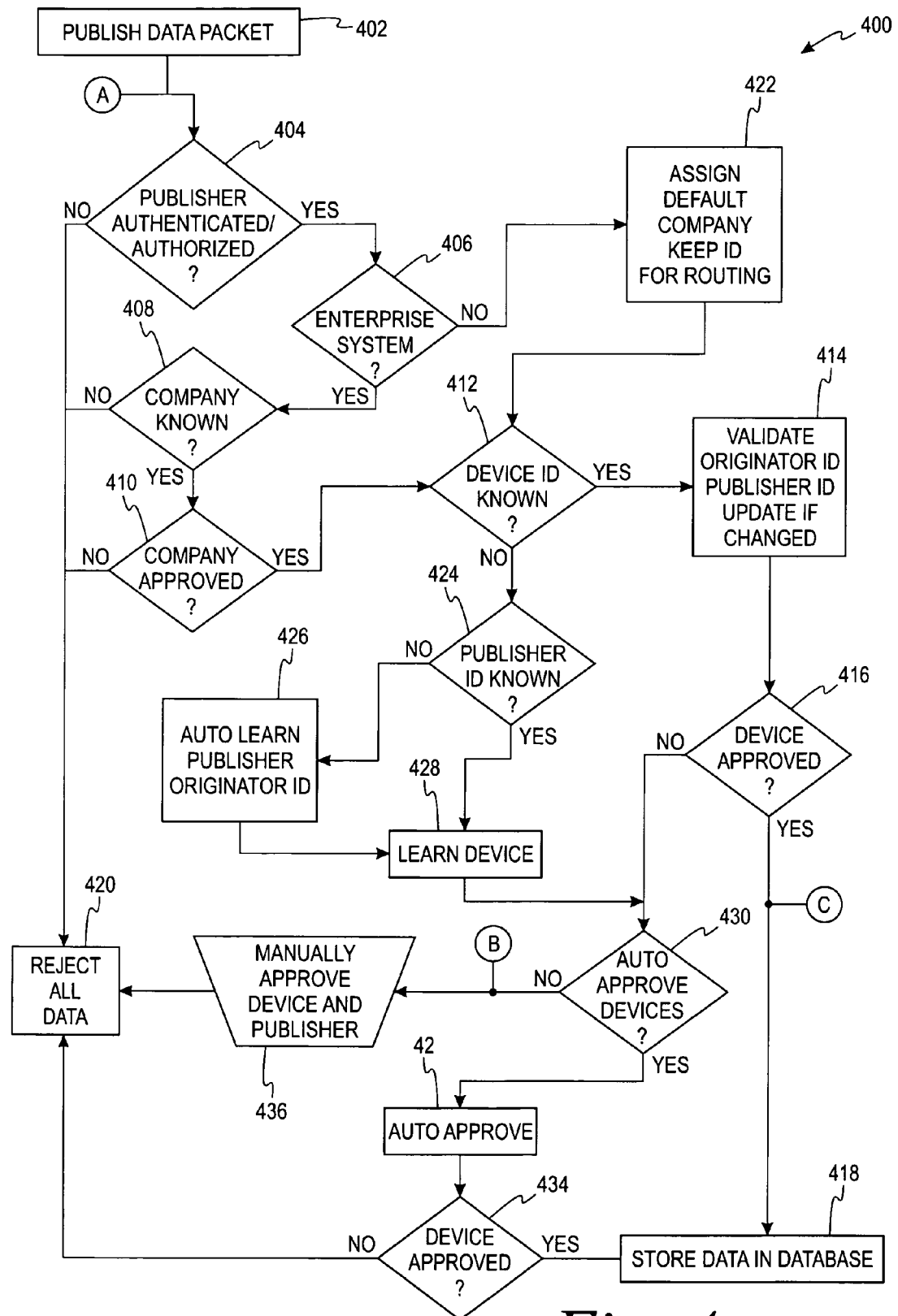
FIG. 4 is a flow chart diagram of an auto-discovery method according to an aspect of the present invention.

FIG. 4 is a flow chart diagram of an auto-discovery method (400) according to an embodiment of the present invention. References will be made to the publisher (or local computer) 106 and the server (or subscriber) 110 for ease of discussion. The publisher 106 publishes a data packet 300 by sending it to the subscriber 110 (402). The data packet 300, which is received from a monitoring device like the meter 102a in the power monitoring system 100, may be buffered in the optional message queue 206 while the subscriber 110 processes the publication request of the publisher 106. The subscriber 110 examines the publisher ID embedded in the data packet 300 to determine whether the publisher 106 is authenticated or authorized to have its data accepted by the subscriber 110 (404). The authentication/authorization aspect prevents unauthorized publishers from accessing the database 212.

If the publisher 106 is authenticated or authorized, the subscriber 110 determines whether the publisher 106 is a member of an enterprise system (406), and if not, assigns a default company to the incoming data packet 300 and retains all identification information for routing purposes (422). If the publisher 106 is a member of an enterprise system, the subscriber 110 determines whether the company is known (408), and, if not, the subscriber 110 rejects all data (420). Optionally, the subscriber 110 maintains a log of all failed attempts to store data in the database 212 for later troubleshooting or security purposes. By checking the enterprise status of the system, the aspects of the present invention may be readily incorporated into legacy systems.

The subscriber 110 determines whether the company is known (410), and if it is not, rejects all data (420). If the company is known (410), the subscriber 110 determines whether the device ID in the data packet 300 is known (412). If the device ID is known (412), the subscriber validates the originator ID and the publisher ID in the data packet 300 and updates these fields if they have changed (414). The subscriber 110 determines whether the device 102a is approved (416), and if so, stores the data in the data packet 300 in the database 212 (418).

Returning to block (412), if the device ID is not known, the subscriber 110 determines whether the publisher ID in the data packet 300 is known (424). If so, the subscriber 110 learns the device 102a (428), described in more detail below. If not, the subscriber 110 automatically learns the publisher ID and the originator ID in the data packet 300 (426) and learns the device 102a (428). The subscriber 110 learns the device 102a by storing in the database 212 at least the device ID from the data packet 300. The next time the device 102a attempts to send a data packet, its device ID will already be stored in the database 212 of the subscriber 110. Note that learning the device 102a does not necessarily mean that the device 102a is approved.

The subscriber 110 determines whether to automatically approve the device 102a (430). The operator may select an option to automatically or manually approve devices, and this option is known to the subscriber 110. If the option is not to automatically approve devices, the operator must manually approve the device and the publisher (436), whereupon the subscriber 110 will reject all data (420) from that publisher 106 and device 102a.

If the option is to automatically approve devices, the subscriber 110 will automatically approve the device 102a (432) such as by setting a flag in the database 212 that indicates the device 102a has been approved. If the device is approved (434), the data in the data packet 300 is stored in the database (418); otherwise it is rejected (420).

Figure 5:
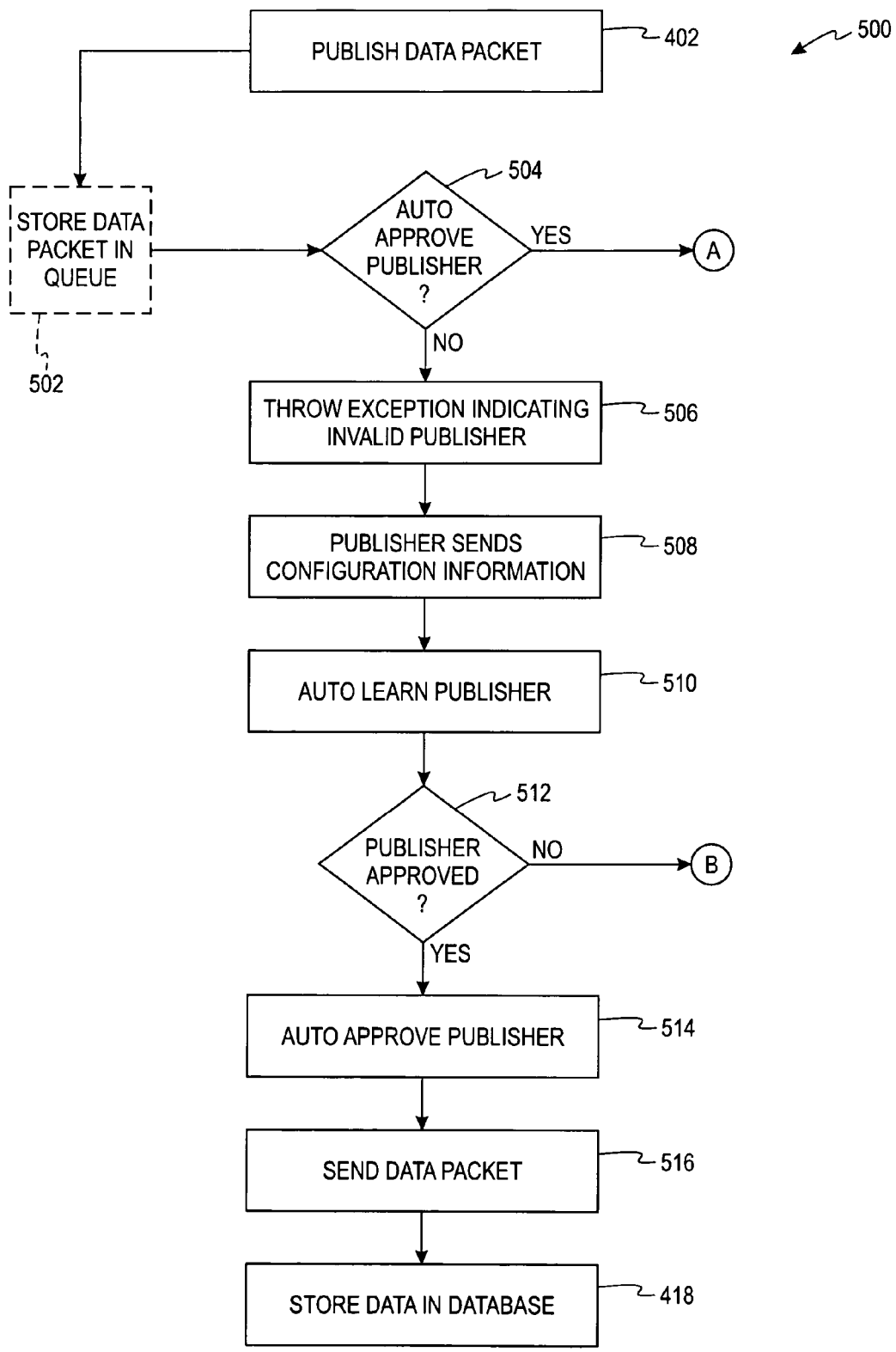
FIG. 5 is a flow chart diagram of a method of automatically learning an unrecognized publisher according to an aspect of the present invention.

FIG. 5 is a flow chart diagram illustrating a method of automatically approving a new publisher according to an embodiment of the present invention (500). The publisher 106 publishes a data packet 300 (402), which is optionally stored in the message queue 206 (502). The subscriber 110 determines from the publisher ID field of the data packet 300 whether the publisher is approved (504). If so, the subscriber determines whether the publisher is authenticated or authorized (404) and proceeds from there with the method set forth in FIG. 4.

If the publisher 106 is not approved (504), the subscriber 110 throws an exception 304 with at least one error code indicating an invalid publisher ID has been received (506). The exception 304 travels back to the publisher 106, which interprets the invalid-publisher-ID error code and sends its configuration information to the subscriber 110. If the subscriber 110 is operating in an auto-learn mode, the subscriber 110 automatically learns the publisher 106 (510) by storing at least its publisher ID in the database 212. The subscriber 110 determines whether to automatically approve the publisher 106 (512). If automatic approval is not set by the operator, the operator must manually approve the publisher 106 (436), and the subscriber 110 rejects the data (420). Otherwise, the subscriber 110 automatically approves the publisher 106 (514), and the data packet 300 is sent either from the publisher 106 or from its message queue 206 to the subscriber 110 (516), which stores it in the database 212 (418).

Figure 6:
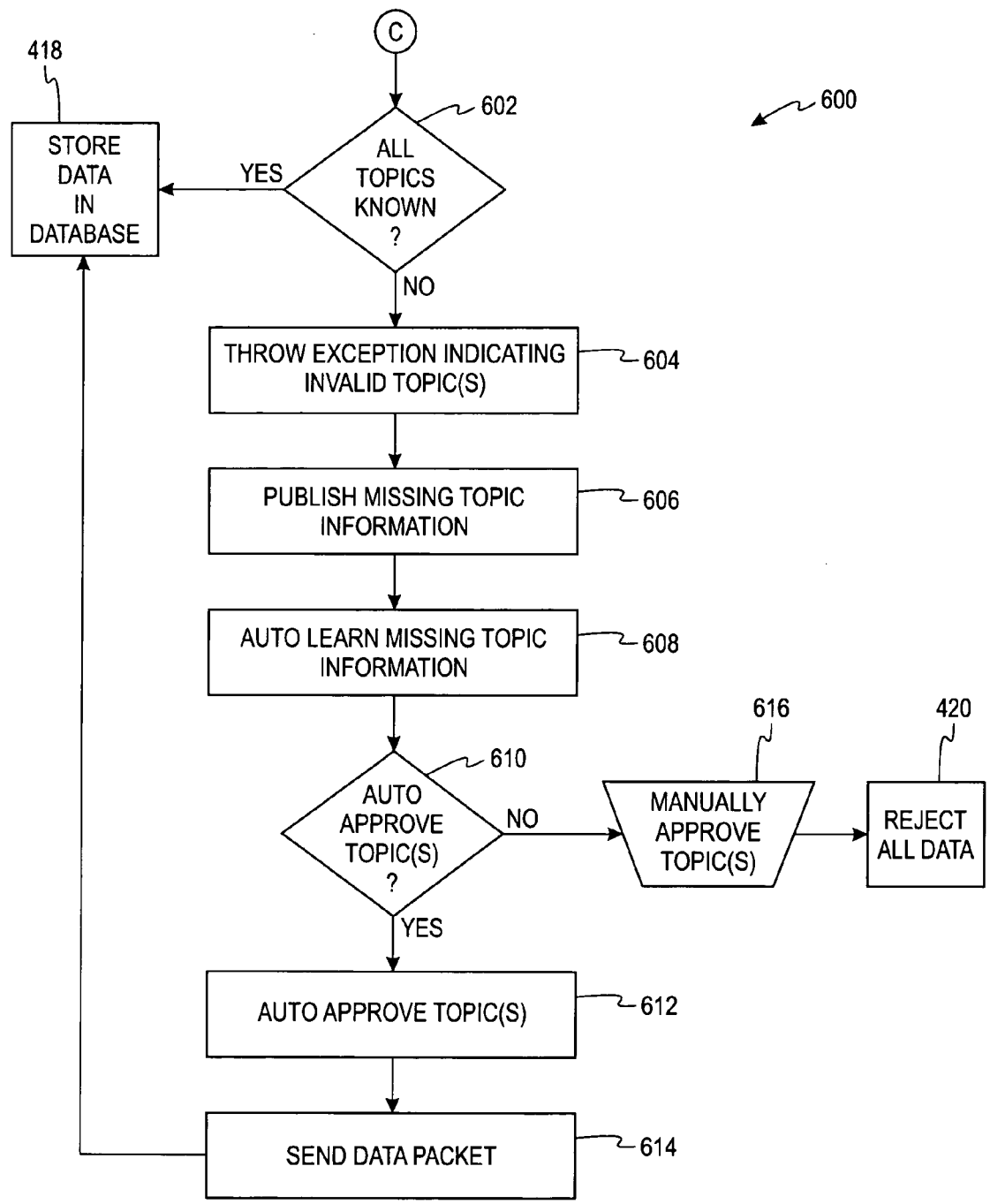
FIG. 6 is a flow chart diagram of a method of automatically learning unrecognized topic information from a new device or an existing device according to an aspect of the present invention.

FIG. 6 is a flow chart diagram illustrating a method of automatically approving new topic information from a data packet in the monitoring system 100 according to an embodiment of the present invention (600). The subscriber 110 determines whether all the topics in the configuration information 302 associated with the device 102a are known. If so, the data in the data packet 300 is stored in the database 212 (418). Otherwise, the subscriber 110 throws an exception 304 with at least one error code indicating that an invalid topic information has been received (604). The exception 304 travels back to the publisher 106, which interprets the invalid-topic-information error code and publishes the missing topic information (there may be one or more missing topics) back to the subscriber 110 (606), which automatically learns the missing topic information by updating the topic information field(s) in the configuration information 302 associated with the device 102a with the missing topic information.

The subscriber 110 determines whether to automatically approve the missing topic(s) (610), and if not, the operator must manually approve the missing topic(s) (616), and the subscriber 110 rejects the data (420). Otherwise, the subscriber 110 automatically approves the missing topic(s) (612) by, for example, setting one or more flags in the configuration information 302 indicating that the missing topics are approved. The data packet 300 is sent from the publisher 106 or its message queue 206 to the subscriber 110, which stores the data in the database 212 (418).

Figure 7:
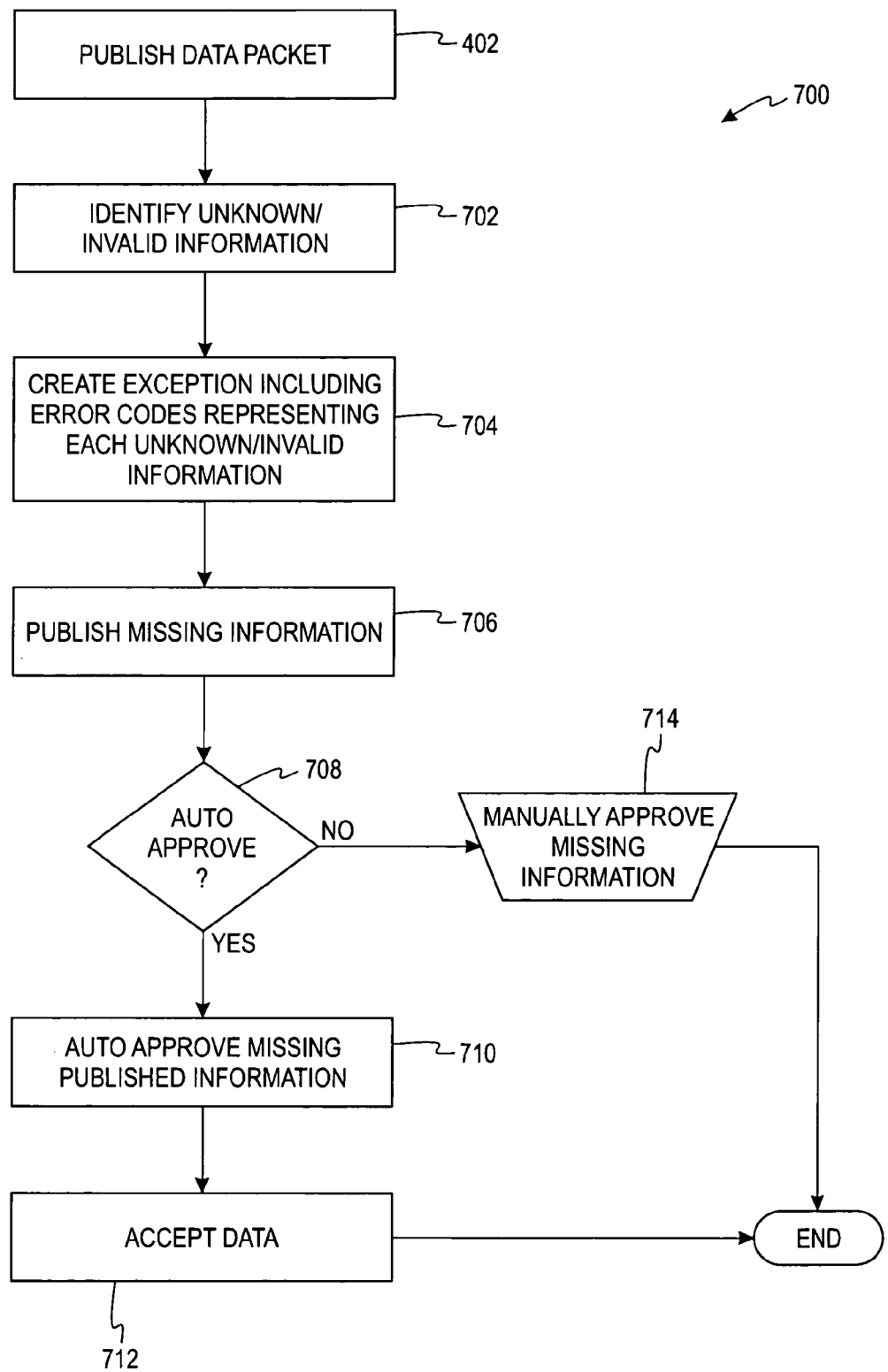
FIG. 7 is a flow chart diagram of a method of automatically discovering missing information according to an aspect of the present invention.

FIG. 7 is a flow chart diagram illustrating a method of auto-approving identification or configuration information according to an embodiment of the present invention. The publisher 106 publishes a data packet 300 (402). The subscriber 110 analyzes the identification information in the data packet 300 and identifies information that is unknown or invalid (702). In this embodiment, multiple pieces of information are unknown to the subscriber 110, which creates an exception 304 including multiple error codes each representing each item of unknown or invalid information. For example, with reference to FIG. 3, the subscriber 110 may recognize the device 102a, but not the publisher 106. The exception 304 would include an error code indicating an invalid originator ID, an invalid publisher ID, and invalid configuration information. The exception 304 is thrown to the publisher 106, which interprets the error codes in the exception 304 to determine which items of information are missing.

The publisher 106 publishes the missing information, such as in the example above the originator ID, the publisher ID, and the configuration information (706). The publisher 106 may also publish any new topic information (706) in order to head off further exception handling by the subscriber 110. If the subscriber is in auto-approve mode, the missing published information is automatically approved (710) by writing the missing information to appropriate identification information and configuration information fields in the database 212 associated with the publisher 106, and the data in the data packet 300 is accepted by the server 110 and stored in its database 212. If the subscriber 110 is in manual-approve mode, the missing published information must be manually entered by the operator (714).

As mentioned above, the following table lists exemplary group names and topics that may be published:

TABLE 1

| Group Name | Topic ID (separate topics delimited by commas or slashes) |
|---|---|
| Currents | Current, Avg Current, Max Current, % Load |
| Voltages | Voltage, Avg Voltage |
| Powers | Real/Reactive/Apparent Power, Fundamental Real/Reactive Power, Harmonic Real Power |
| Demand Readings | Demand Current, K-Factor Demand, Peak Demand Current, Coincident K-Factor Demand Peak, Coincident Current Demand Peak, Demand (Real/Reactive/Apparent) Power, Peak Demand (Real/Reactive/Apparent) Power, KW/KVAR/KVA Demand, Electric KW Demand Synch Pulse |
| Energies | Real/Reactive Energy Into/Out of Load, Apparent/Real/Reactive Energy, Conditional/Incremental Real/Reactive/Apparent Energy In/Out, Present Interval Incremental Real/Reactive/Apparent Energy In/Out, Electric Accumulated Energy |
| Power Factors | Power Factor, Displacement Power Factor |
| Power Quality | THD/thd Current, THD/thd Voltage, K-Factor, Crest Factor, Harmonic Factor, Distortion Power Phase/Factor, Harmonic Current, Harmonic Voltage, Harmonic Voltage, Harmonic Voltage, Total Demand Distortion |
| Unbalance Readings | Current Unbalance, Voltage Unbalance |
| Fundamental Phasors | Fundamental Current Magnitude/Angle, Fundamental Voltage Magnitude/Angle |
| Minimum Readings | Minimum Temperature, Minimum Current, Minimum Voltage, Minimum Power Factor, Minimum Displacement Power Factor, Minimum Real/Reactive/Apparent Power Factor, Minimum THD/thd Current/Voltage, Minimum K-Factor, Minimum Crest Factor, Minimum Fundamental Real/Reactive Power, Minimum Harmonic Factor/Current/Voltage, Minimum Harmonic Real Power, Minimum Analog Input, Minimum Fundamental Current/Voltage, Minimum Distortion Power |
| Maximum Readings | Maximum Temperature, Maximum Current, Maximum Voltage, Maximum Power Factor, Maximum Displacement Power Factor, Maximum Real/Reactive/Apparent Power Factor, Maximum THD/thd Current/Voltage, Maximum K-Factor, Maximum Crest Factor, Maximum Fundamental Real/Reactive Power, Maximum Harmonic |

TABLE 1-continued

| Group Name | Topic ID (separate topics delimited by commas or slashes) |
|---|---|
| Ratings | Factor/Current/Voltage, Maximum Harmonic Real Power, Maximum Analog Input, Maximum Fundamental Current/Voltage, Maximum Distortion Power Rated Ampacity, Rated Nominal Voltage, Rated KW/KVA/THD/Power Factor/KVAR, Rated Temperature, Rated User Defined Value |
| Demand Voltages | Demand Voltage, Min/Max Demand Voltage |
| Spectral Components | Meter Type, Voltage/Current Magnitude/Angle |
| Breaker/Trip Unit Status | Breaker Position, Trip Unit Door Status, Time Remaining to LT Trip, Remote Opening/Closing Enabled, Remote Control Enabled, Spring Charged, Breaker Ready to Close, Relay Module Status, Current Unbalance Alarm Status, Over-current Demand Alarm Status, Under/over-voltage Alarm Status, Reverse Power Alarm Status, Under/over Frequency Alarm Status, Phase Rotation Alarm Status, Load Shed Current Alarm Status, Load Shed Power Alarm Status, Current Unbalance Pre-Alarm Status |
| Cycle-by-Cycle Trending | Cycle-by-cycle current, Cycle-by-cycle voltage Meter Register Number, Scale Factor, 1-Minute/1-Hour/ 1-Day/1-Month Reading Last Second/Minute/Hour/Day/Month/Year, 1-Minute/1-Hour/ 1-Day/1-Month Statistics Avg Reading, Daily/Hourly Forecast Std Deviation/Avg Reading, Summary of Hourly/Weekly Statistics Avg/Min/Max/Std Dev |
| Input Metering | Consumption Units, Rate Units, Demand Last, Present Demand, Avg Demand Calc, Peak Demand, Cumulative Usage |
| Water | Water Flow, Water Flow Previous Day Total, Water Flow Current Day Total, Water Flow Incremental, Water Flow Rate, Water Flow Rate Min/Max/Hourly Average/Daily Average/Weekly Average/Monthly Average, Water Heat Flow, Water Heat Flow Min/Max/Hourly Avg/Daily Avg/Weekly Avg/Monthly Avg, Water Temperature Supply, Water Temperature Supply Min/Max/Hourly Avg/Daily Avg/Weekly Avg/Daily Avg, Water Temperature Return, Water Temperature Return Min/Max/Hourly Avg/Daily Avg/Weekly Avg/Daily Avg, Water Flow Rate, Water Flow Rate Min/Max/Hourly Avg/Daily Avg/Weekly Avg/Daily Avg, Sewage Flow Rate, Sewage Flow Rate Min/Max/Hourly Avg/Daily Avg/Weekly Avg/Daily Avg |
| Air | Air Pressure, Air Pressure Min/Max/Hourly Avg/Daily Avg/Weekly Avg/Daily Avg, Air Flow, Air Flow Min/Max/Hourly Avg/Daily Avg/Weekly Avg/Daily Avg, Air Temperature, Air Temperature Min/Max/Hourly Avg/Daily Avg/Weekly Avg/Daily Avg |
| Gas | Gas Flow, Gas Flow Min/Max/Hourly Avg/Daily Avg/Weekly Avg/Daily Avg, Gas Flow Rate, Gas Flow Rate Min/Max/Hourly Avg/Daily Avg/Weekly Avg/Daily Avg, Gas Temperature, Gas Temperature Min/Max/Hourly Avg/Daily Avg/Weekly Avg/Daily Avg, Gas Pressure, Gas Pressure Min/Max/Hourly Avg/Daily Avg/Weekly Avg/Daily Avg |
| Steam | Steam Flow, Steam Flow Min/Max/Hourly Avg/Daily Avg/Weekly Avg/Daily Avg, Steam Flow Rate, Steam Flow Rate Min/Max/Hourly Avg/Daily Avg/Weekly Avg/Daily Avg, Steam Heat, Steam Heat Min/Max/Hourly Avg/Daily Avg/Weekly Avg/Daily Avg, Steam Temperature, Steam Temperature Min/Max/Hourly Avg/Daily Avg/Weekly Avg/Daily Avg, Steam Pressure, Steam Pressure Min/Max/Hourly Avg/Daily Avg/Weekly Avg/Daily Avg |
| Weather Station | Barometric Pressure, Barometric Pressure Min/Max/Hourly Avg/Daily Avg/Weekly Avg/Daily Avg, Dew Point, Dew Point Min/Max/Hourly Avg/Daily Avg/Weekly Avg/Daily Avg, Relative Humidity, Relative Humidity Min/Max/Hourly Avg/Daily Avg/Weekly Avg/Daily Avg, Wind Speed, Wind Speed Min/Max/Hourly Avg/Daily Avg/Weekly Avg/Daily Avg, Wind Direction, Temperature, Temperature Min/Max/Hourly Avg/Daily Avg/Weekly Avg/Daily Avg, Solar Radiation, Solar Radiation Min/Max/Hourly Avg/Daily Avg/Weekly Avg/Daily Avg, Precipitation, Precipitation Previous/Current Day Total |

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of auto-discovering information associated with devices arranged in a monitoring system that monitors measurable quantities of a utility, comprising:
    receiving configuration information from a local computer in the monitoring system at a server, the local computer attempting to send a data packet associated with a device to the server, the device measuring a characteristic of the utility and storing data indicative of the measured characteristic, the data packet including the data and identification information, the configuration information including at least information indicative of a type of the device and topic information indicative of a type of the data in the data packet, the identification information including a unique device identification (ID) associated with the device, a publisher ID indicating an identity of which local computer is attempting to send the data packet, and an originator ID indicating an identity of an installation in which the device is installed;
    determining from the configuration information whether the local computer is approved to have the data packet accepted by the server, the determining including comparing the configuration information against system configuration stored in the server;
    responsive to the comparing, throwing from the server to the local computer an exception that includes an error code indicating that the configuration information or the identification information in the data packet includes information not recognized by the server;
    responsive to the determining, if the local computer is approved, determining whether the device is approved to have the data packet accepted by the server;
    responsive to the determining, if the local computer is not approved because the configuration information is not recognized by the server, automatically approving the local computer by updating the system configuration with the configuration information;
    responsive to the determining, if the local computer is not approved because the identification information in the data packet is not recognized by the server, learning the identification information by storing the identification information in the server such that subsequent data packets associated with the device sent from the local computer to the server will be recognized as having been sent from the device; and
    responsive to the determining, if the local computer is approved and the device is approved to have the data packet accepted by the server, storing in the server the data packet.

2. The method of claim 1, wherein the exception is selected from among a plurality of exception types, each exception type indicating that information which is required by the server to approve the device.

3. The method of claim 2, wherein the configuration information includes local computer information, device information, and topic information.

4. The method of claim 3, wherein a first exception type indicates that the topic information is not approved by the server.

5. The method of claim 4, wherein the topic information is a topic that relates to an electrical characteristic.

6. The method of claim 3, wherein a first exception type indicates that the local computer information is not approved by the server.

7. The method of claim 3, wherein a first exception type indicates that the device information is not approved by the server.

8. The method of claim 1, wherein the utility is selected from the group consisting of water, air, gas, energy, steam, and weather.

9. The method of claim 8, wherein the monitoring system is a power monitoring system and the utility is energy.

10. The method of claim 9, wherein the data packet includes electrical data.

11. The method of claim 1, wherein the data packet includes identification information, the method further comprising:
    determining from the identification information whether the device is approved to have the data packet accepted by the server;
    if the device is approved, accepting the data packet at the server and storing the data packet in a database of the server; and
    if the device is not approved, throwing an exception from the server to the local computer, the exception indicating which identification information is required by the server to accept the data packet, and automatically approving the device.

12. The method of claim 11, further comprising:
    queuing the data packet in a queue of the local computer;
    responsive to the device not being approved and automatically approving the device, receiving the data packet from the queue and storing the data packet in the database.

13. The method of claim 1, further comprising queuing the data packet in the local computer until the data packet is accepted by the server.

14. The method of claim 1, further comprising queuing the data packet in the server until the data packet is accepted by the server.

15. The method of claim 1, wherein the receiving is carried out behind a firewall imposed between the local computer and the server, the throwing including throwing from the server to the device the exception through the firewall.

16. The method of claim 1, wherein the local computer includes the server.

17. The method of claim 1, wherein the configuration information is information relating to the local computer.

18. The method of claim 1, wherein the configuration information is information relating to the device.

19. The method of claim 1, further comprising:
    automatically approving at least some of the unrecognized configuration information; and
    repeatedly sending the data packet until the server accepts the data packet.

20. The method of claim 1, further comprising queuing the data packet in the local computer or the server until the server accepts the data packet.

21. A non-transitory computer readable storage medium encoded with instructions for directing a controller to perform the method of claim 1.

22. The method of claim 1, wherein the exception is selected from among a plurality of exception types, each exception type indicating a different type of configuration information that is required by the server.

* * * * *